United States Patent
Kelliher

(10) Patent No.: US 7,142,591 B2
(45) Date of Patent: Nov. 28, 2006

(54) METHOD AND SYSTEM FOR OVERSUBSCRIBING A POOL OF MODEMS

(75) Inventor: Timothy L. Kelliher, Alameda, CA (US)

(73) Assignee: UTStarcom, Inc., Almameda, CA (US)

( * ) Notice: Subject to any disclaimer, the term of this patent is extended or adjusted under 35 U.S.C. 154(b) by 163 days.

(21) Appl. No.: 10/159,496

(22) Filed: May 31, 2002

(65) Prior Publication Data

US 2003/0074480 A1    Apr. 17, 2003

Related U.S. Application Data

(63) Continuation-in-part of application No. 10/074,832, filed on Feb. 13, 2002.

(60) Provisional application No. 60/328,648, filed on Oct. 11, 2001.

(51) Int. Cl.
    *H04B 1/38* (2006.01)
(52) U.S. Cl. .................................................. 375/222
(58) Field of Classification Search ................ 375/219, 375/220, 222, 377; 379/93.09; 709/250, 709/253; 370/352, 401
    See application file for complete search history.

(56) References Cited

U.S. PATENT DOCUMENTS 3,676,846 A * 7/1972 Busch ......................... 714/749
4,112,264 A * 9/1978 Abramson et al. .......... 714/712
4,393,492 A   7/1983 Bishop
4,730,311 A   3/1988 Carse et al.

(Continued)

FOREIGN PATENT DOCUMENTS

WO    WO 99/20033    4/1999

OTHER PUBLICATIONS

U.S. Appl. No. 10/074,832, filed Feb. 13, 2002, Kelliher.

(Continued)

*Primary Examiner*—Young T. Tse
(74) *Attorney, Agent, or Firm*—McDonnell Boehnen Hulbert & Berghoff LLP

(57) ABSTRACT

A system for oversubscribing a pool of modems comprises at least one digital signal processor and a switch. The digital signal processor is configured as a variable number of high speed data modems and a variable number of low bandwidth synchronization modems. A communication bus is connected to the digital signal processor for configuring the processor, connecting the system to external devices, and communicating status information with external devices. The high speed data modems and low bandwidth synchronization modems are connected, via the switch, to customer premise equipment devices. Active data and synchronization data is transferred between the high speed data modems, the low bandwidth synchronization modems, and respective customer premise equipment devices. The synchronization modems consume significantly less power than the high speed data modems. If there are more modems than there are customer premise equipment devices, some modems are turned off completely thereby further reducing power consumption.

19 Claims, 8 Drawing Sheets

U.S. PATENT DOCUMENTS

| | | | |
|---|---|---|---|
| H1175 | H | 4/1993 | Giorgio |
| 5,260,937 | A | 11/1993 | Eames et al. |
| 5,390,239 | A | 2/1995 | Morris et al. |
| 5,668,857 | A | 9/1997 | McHale |
| 5,852,655 | A | 12/1998 | McHale et al. |
| 5,898,761 | A | 4/1999 | McHale et al. |
| 5,905,778 | A | 5/1999 | Shires |
| 5,923,671 | A | 7/1999 | Silverman |
| 5,991,311 | A * | 11/1999 | Long et al. .................. 370/524 |
| 6,005,873 | A | 12/1999 | Amit |
| 6,009,106 | A | 12/1999 | Rustad et al. |
| 6,014,431 | A | 1/2000 | McHale et al. |
| 6,061,392 | A | 5/2000 | Bremer et al. |
| 6,084,874 | A | 7/2000 | Nguyen et al. |
| 6,128,300 | A * | 10/2000 | Horton .................. 370/395.65 |
| 6,157,638 | A * | 12/2000 | Tayloe et al. ................ 370/358 |
| 6,160,808 | A | 12/2000 | Maurya |
| 6,160,843 | A | 12/2000 | McHale et al. |
| 6,169,788 | B1 | 1/2001 | McHale et al. |
| 6,198,749 | B1 | 3/2001 | Hui et al. |
| 6,282,273 | B1 * | 8/2001 | McHale et al. .......... 379/93.28 |
| 6,324,212 | B1 | 11/2001 | Jenness |
| 6,349,123 | B1 | 2/2002 | Kim |
| 6,373,852 | B1 | 4/2002 | Foladare et al. |
| 6,373,860 | B1 * | 4/2002 | O'Toole et al. ............. 370/493 |
| 6,385,203 | B1 * | 5/2002 | McHale et al. ............. 370/401 |
| 6,477,595 | B1 * | 11/2002 | Cohen et al. ............... 710/105 |
| 6,671,287 | B1 * | 12/2003 | Huttunen et al. ........... 370/469 |
| 6,724,849 | B1 * | 4/2004 | Long et al. .................. 375/371 |
| 6,741,599 | B1 * | 5/2004 | Dunn et al. .............. 370/395.6 |
| 6,744,883 | B1 * | 6/2004 | Bingel et al. .......... 379/399.01 |
| 6,798,769 | B1 * | 9/2004 | Farmwald .................... 370/352 |
| 6,804,267 | B1 * | 10/2004 | Long et al. .................. 370/524 |
| 2001/0043568 | A1 * | 11/2001 | McHale et al. ............. 370/254 |
| 2003/0074480 | A1 * | 4/2003 | Kelliher ..................... 709/253 |

OTHER PUBLICATIONS

"X-Cel & GDSL System V.90 Rls@ Analog Modem Support," GoDigital Networks-Technical Note, 7 pages, Jan. 23, 2001.

"Connection Optimized Link Technology," White paper, Ramp Networks, 6 pages, (1998).

"Powerful Internet and Remote Access Platform," WebRamp 361i, 2 pages, Mar. 2000.

"Dualing Modems Reach 112K," Wired News, 3 pages, Feb. 3, 2000.

"SupraSonic Dual Modem: Twice is Nice," PCWorld.com, 3 pages, Jul. 27, 1998.

"Copper Edge 200 RT DSL Concentrator," 4 pages, Aug. 2001.

"Multi-Tenant Unit Profitability Analysis," 10 pages, Dec. 2000.

* cited by examiner

METHOD AND SYSTEM FOR OVERSUBSCRIBING A POOL OF MODEMS

This application is a continuation-in-part of U.S. patent application Ser. No. 10/074,832, filed Feb. 13, 2002 by Timothy L. Kelliher, and entitled "Method and System for Oversubscribing a DSL Modem," pending, which claims the benefit of U.S. Provisional Application No. 60/328,648, filed Oct. 11, 2001.

BACKGROUND

Typically a digital subscriber line (DSL) network comprises a plurality of customer premise equipment (CPE) devices connected to a DSLAM (digital subscriber line access multiplexer) via a bundle of twisted-pair wires. FIG. 1 illustrates such a prior art DSL network. The DSLAM is also connected to a network for sending and receiving data to and from the respective CPE devices. The DSLAM may further be connected to other devices, such as routers, for directing and switching data through the DSL network. A DSLAM comprises a plurality of DSL modems which may be implemented in software residing on one or more digital signals processors (DSP). The customer premise equipment may include a variety of devices such as modems and handsets. By way of example the customer premise equipment of FIG. 1 comprise DSL modems capable of communicating with the DSLAM.

Each of the N CPE DSL modems of FIG. 1 are connected directly to a respective DSL modem in the DSLAM via a dedicated twisted-pair conductor, or POTS (plain old telephone service) line. The twisted-pair conductors are usually part of the public switched telephone network (PSTN). Typically these lines are supplied in bundles of 25 twisted-pair conductors per bundle. There may be greater or fewer twisted-pair conductors per bundle. For example, a typical DSLAM may supply DSL service at VDSL data rates to 25 DSL modems located at the customer end. VDSL data rates are up to 26 Mbps (megabits per seconds) upstream and downstream. Other forms of DSL service having different data rates may also be supplied such as ADSL (up to 1.5 Mbps upstream, 8 Mbps downstream), SHDSL (up to 4 Mbps upstream and downstream), and HDSL (1.5 Mbps upstream and downstream).

High speed dedicated DSL service as described above has many disadvantages. For example, with 25 DSL modems at the customer end, and with each dedicated line capable of carrying data at a rate of 1.5 Mbps, the DSLAM must be able to process data at a rate of 37.5 Mbps. Such high data rate requirements typically require a pool of high speed, and expensive digital signal processors. In addition to the expense, the large number of high speed DSPs require large amounts of power, which is frequently in short supply at some of the remote locations that the DSLAMs may be located in.

Furthermore, while dedicated DSL service is supplied to the customer, it is often not needed. Most customer's DSL modems sit idle through much of the day and night. For example, for the most part the customer's DSL modem is not being used while the customer is away at work, or asleep. This represents the majority of the day, even for heavy home computer users. Additionally, even when a customer is using their computer and DSL modem, the DSL communications tend to be bursty. That is, a user might need or want a large amount of bandwidth to download or upload files, but once the file transfers have completed the DSL line servicing the customer might carry only a small amount of data for comparatively long periods of time while the customer uses their computer to view files, write letter, etc.

Thus a need presently exists for a system and method to supply DSL service to customers in a more intelligent, cost effective, and power efficient way.

SUMMARY

By way of introduction, the preferred embodiments below provide a method and system for oversubscribing a pool of modems. The system is connected between at least one upstream data link and a plurality of N downstream data links. Each downstream data link is coupled to respective customer premise equipment devices. The system comprises at least one programmable digital signal processor configured as M high speed data modems and P low bandwidth synchronization modems. A communication bus is connected to the digital signal processor or processors for configuring the processors. The bus also allows the system to be connected to external devices, and share various operating statistics and information with the external devices. A switch is connected to the N downstream data links, the M high speed data modems, and the P low bandwidth communication modems. Furthermore, the M high speed data modems are in communication with the at least one upstream data link for coupling the system to an external network.

Providing the at least one digital signal processor connected to the communication bus, the processor or processors are configured via the bus as M high speed data modems and N low bandwidth synchronization modems. The high speed data modems are connected to a first set of M customer premise equipment devices. The low bandwidth synchronization modems are connected to a first set of P customer premise equipment devices. Active or user traffic data is transferred between the high speed data modems and the first set of M customer premise equipment devices. Synchronization data is transferred between the low bandwidth synchronization modems and the first set of P customer premise equipment devices, which are kept in a low bandwidth idle mode. By maintaining synchronization with the customer premise equipment devices in an idle mode, the devices can be switched much more easily, efficiently, and quickly into an active mode than if synchronization is not maintained. Other advantages gained by maintaining synchronization will become apparent to those skilled in the art.

Preferably, requests from the customer premise equipment devices for high speed data service are inferred by monitoring the streams of data flowing on the downstream data links. Alternatively, explicit requests may be made by embedding signals with in DSL superframes. Contingent with the requests, system resources, and system configuration, the high speed data modems are connected to a second set of M customer premise equipment devices, and the low bandwidth synchronization modems are connected to a seconds set of P customer premise equipment devices. Active or user traffic data is then transferred between the high speed data modems and the second set of M customer premise equipment devices. Synchronization data is transferred between the synchronization modems and the second set of P customer premise equipment devices. The modems are continually reconnected to differing sets of customer premise devices as requests for data and network activity changes.

The power requirements of the low bandwidth synchronization modems are about 30 percent or less than the power requirements of the high speed data modems. Accordingly, given M+P=N customer premise equipment devices, power requirements of the system can be reduced by increasing the number of P low bandwidth synchronization modems and decreasing the number of M high speed data modems, while still providing high speed data service to N customer premise equipment devices. Conversely, the number of P low bandwidth synchronization modems can be decreased and the number of M high speed data modems increased for providing greater aggregate bandwidth at the expense of increased power requirements. Additionally, if there are more modems than there are customer premise equipment devices, that is M+P>N, or some of the ports of the system remain unconnected to a customer premise equipment device, the modems associated with those unconnected ports are switched off completely. This reduces wasted processing resources and power. If a customer premise equipment device is connected to a port associated with a modem that is off, the modem is switched on and configured as a high speed data modem or a low bandwidth synchronization modem.

The foregoing paragraphs have been provided by way of general introduction, and they should not be used to narrow the scope of the following claims. The preferred embodiments will now be described with reference to the attached drawings.

DETAILED DESCRIPTION OF THE PRESENTLY PREFERRED EMBODIMENTS

System Overview

Figure 1:
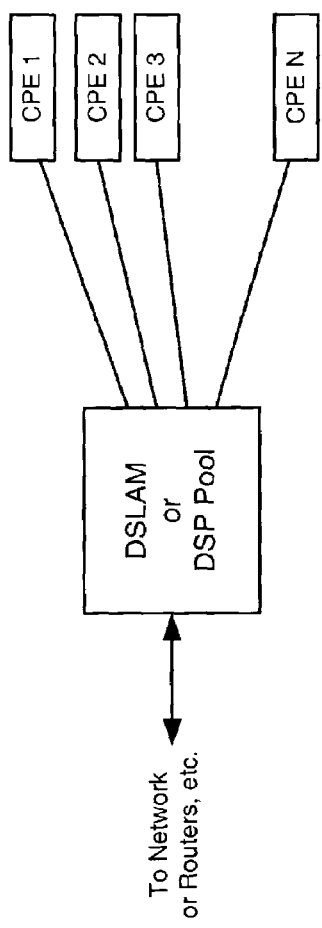
FIG. 1 is a prior art DSL network.
Figure 2:
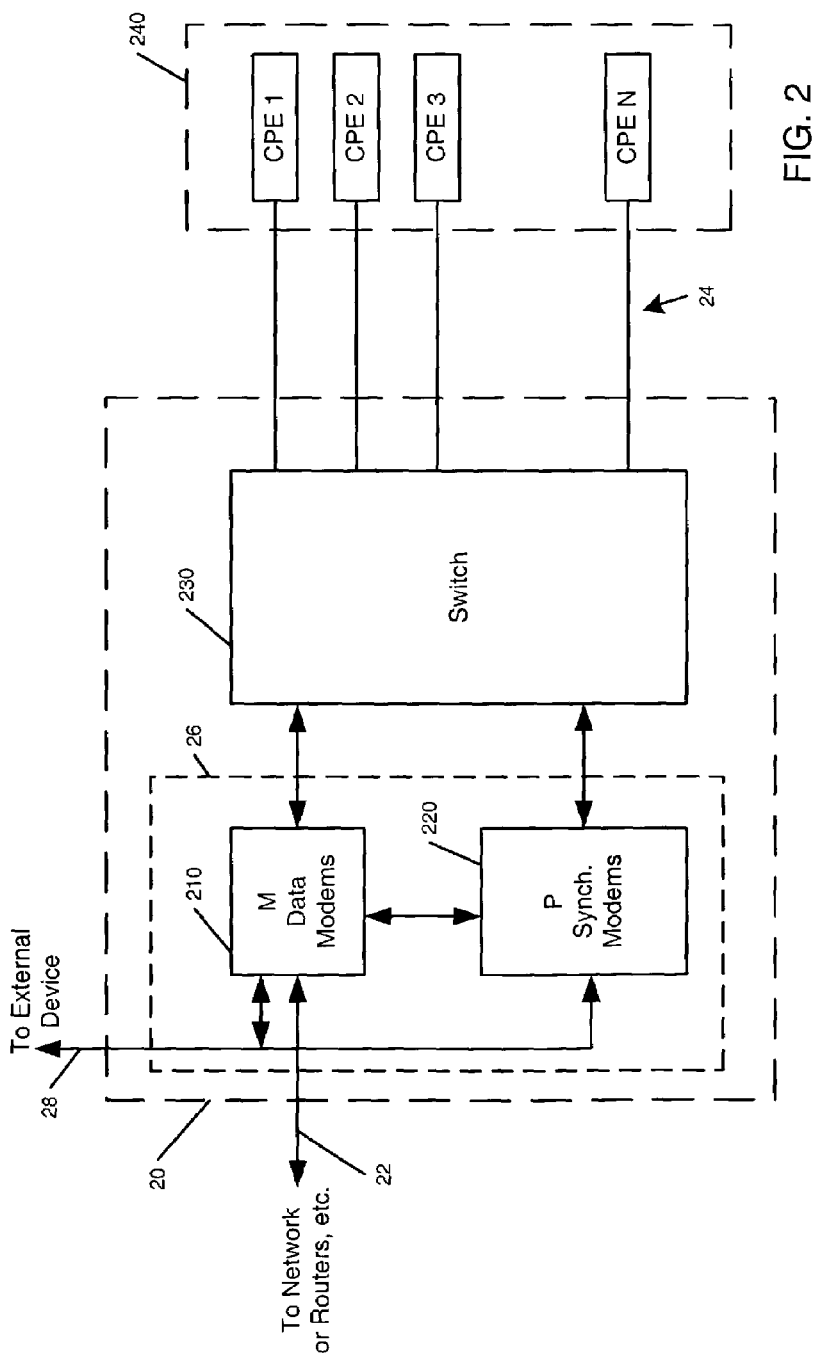
FIG. 2 is a system for oversubscribing a pool of modems.

FIG. 2 illustrates a preferred embodiment of a system for oversubscribing a pool of modems. The modem switching system 20 comprises a switch 230, and at least one programmable digital signal processor (DSP) 26 connected to a communication bus 28. The at least one digital signal processor 26 is configured via the communication bus 28 as M high speed data modems 210, and P low bandwidth synchronization modems 220. That is, the digital signal processor or processors 26 are programmed via the communication bus 28 to execute software instructions that cause the digital signal processor to emulate one or more types of modems. More than one digital signal processor may be necessary to implement the modems 210, 220. Typically, there are M+P digital signal processors providing one digital signal processor for each modem implemented. Each digital signal processor is connected to the communication bus 28.

The high speed data modems 210 are preferably ADSL or HDSL modems but may be VDSL, SHDSL or any other DSL standard implementation. The terms "DSL" and "xDSL" are used interchangeably herein and are intended to refer to any DSL standard such as those mentioned above. Furthermore, while the following descriptions and examples are framed in terms of DSL communications, the high speed data modems may also comprise ITU-T V series modems such as modems complying with the ITU-T V.90 standard.

The low bandwidth synchronization modems are preferably Operation Administration Maintenance (OAM) or Embedded Operations Channel (EOC) modems. The terms "low bandwidth synchronization modems", "OAM modems", "EOC modems", and "OAM/EOC modems" are used interchangeably herein.

The switching system 20 is connected between at least one upstream data link 22 and a plurality of up to N downstream data links 24. Each downstream data link is coupled to respective customer premise equipment devices 240. The upstream data links 22 may comprise, for example, a plain old telephone service (POTS) line, optical fiber, a twisted pair conductor, the Public Switched Telephone Network (PSTN), a T1connection, a T3 connection, an ISDN connection, coaxial cable, an SHDSL link, an ADSL link, a VDSL link, an HDSL link, a V.90 link, an OCn link, and the like. The downstream data links 24 preferably comprise POTS lines, but may also include coaxial cable. The terms "POTS lines" and "twisted pair conductors" are used interchangeably.

The M high speed data modems 210 provide high speed data service, such as xDSL service, including the transfer of user traffic data, also known as active data, between the upstream data links 22 and M of the N customer premise equipment devices 240 via the downstream data links 24. User traffic data includes e-mail, software downloads and updates, web pages, audio and video files, data for maintaining a user's computer on a network, and the like. The P low bandwidth synchronization modems maintain active xDSL lines by communicating synchronization data to P of the N customer premise equipment devices 240 via the downstream data links 24. The terms "active DSL lines" and "synchronized DSL lines" are intended broadly to mean that a link and a customer premise equipment device connected to the link remains in a state as if the link and the customer premise equipment device were connected to a DSL modem.

By maintaining active and synchronized DSL lines and CPE devices even when user traffic data is not being transferred, the time between when communication is requested to or from a CPE device to when communication actually begins is very small, on the order of 17 ms. 17 ms represents the length of one ADSL superframe.

In contrast if the lines are not kept active, that is synchronization of the superframes are lost, the time between when communication is requested to or from a customer premise equipment device to when communication actually begins can be on the order of 3 to 15 seconds. This substantial time delay is due in part to the overhead required to set up an active DSL line.

Typically both the user traffic data and the synchronization data are communicated via superframes. Superframes are defined in standards ANSI T1.4131998-1998 and ITU G.992.2, both of which are hereby incorporated by reference. The superframes communicated by the P low bandwidth synchronization modems carry very little user traffic data and thus have bandwidth requirements only a fraction of that of superframes communicated by the M high speed data modems.

The low bandwidth synchronization modems process around 32 Kbps per channel for ADSL or VDSL and are responsible for monitoring and acting on the OAM and EOC channels in the DSL superframe. Thus the bandwidth overhead for the OAM and EOC channels to maintain all active lines is very small. In contrast, the bandwidth requirements of each of the high speed data modems is up to around 8 Mbps for ADSL or 26 Mbps for VDSL. So an OAM or EOC modem need only be able to process less than about 1% of the bandwidth of a DSL modem. Consequently, low bandwidth synchronization modems typically require about 30% or less of the power of a high speed data modem. OAM and EOC channels are described in detail in ANSI T1.413-1998.

The Switch 230 connects the M high speed data modems 210 and the P low bandwidth synchronization modems 220 to respective customer premise equipment devices 240 via the downstream data links 24. The switch 230 is reconfigured in response to requests to send and receive user traffic data to and from the N customer premise equipment devices 240, thereby providing high speed data service such as xDSL service to a set of M customer premise equipment devices and maintaining active xDSL lines to the remaining P customer premise equipment devices.

While not explicitly show in FIG. 2, depending on specific system requirements, system 20 may also include interface means comprising digitizer circuitry, 2to4 hybrids, line drivers, isolation circuitry, and other interface circuitry and filters for coupling the at least one digital signal processor 26 with the switch 230, and for coupling the switch 230 with the downstream data links 24. Also, depending on specific system requirements, the individual components of the interface means may be connected in various configuration relative to the switch 230, downstream data links 24, and digital signal processor 26.

The high speed data modems 210 and the low bandwidth synchronization modems 220 operate as defined in ANSI T1.413 and ITU G.992. Determining if traffic is active data or synchronization data is accomplished by monitoring the data communicated between the high speed data modems 210 and the customer premise equipment devices 240 to which the modems 210 are connected. Briefly, if a data stream associated with an individual customer premise equipment device 240, and the port to which it is connected via a downstream data link 24, is determined to comprise synchronization data and no active data, the port is switched to a synchronization modem 220. This action connects the customer premise equipment device to a synchronization modem. If the data stream becomes active, that is the stream comprises active or user data, the port may be switched from the synchronization modem 220 to a high speed data modem 210. Thus, requests to send and receive active data, and the removal of those requests, are inferred from the characteristics of the data streams themselves rather than making a request via an explicit and independent request signal or signals.

Alternatively, explicit requests such as Request-to-Send (RTS) and Clear-to-Send (CTS) signals may be used. Preferably, requests to send and receive user traffic data are embedded within superframes, as will be discussed below. RTS and CTS signals are discussed in detail in US Patent Application "System for Enhancing Data Transfer", Inventor Michael Farmwald, Filing Date Sep. 13, 2001, application Ser. No. 09/951,351, which is hereby incorporated by reference.

Figure 3:
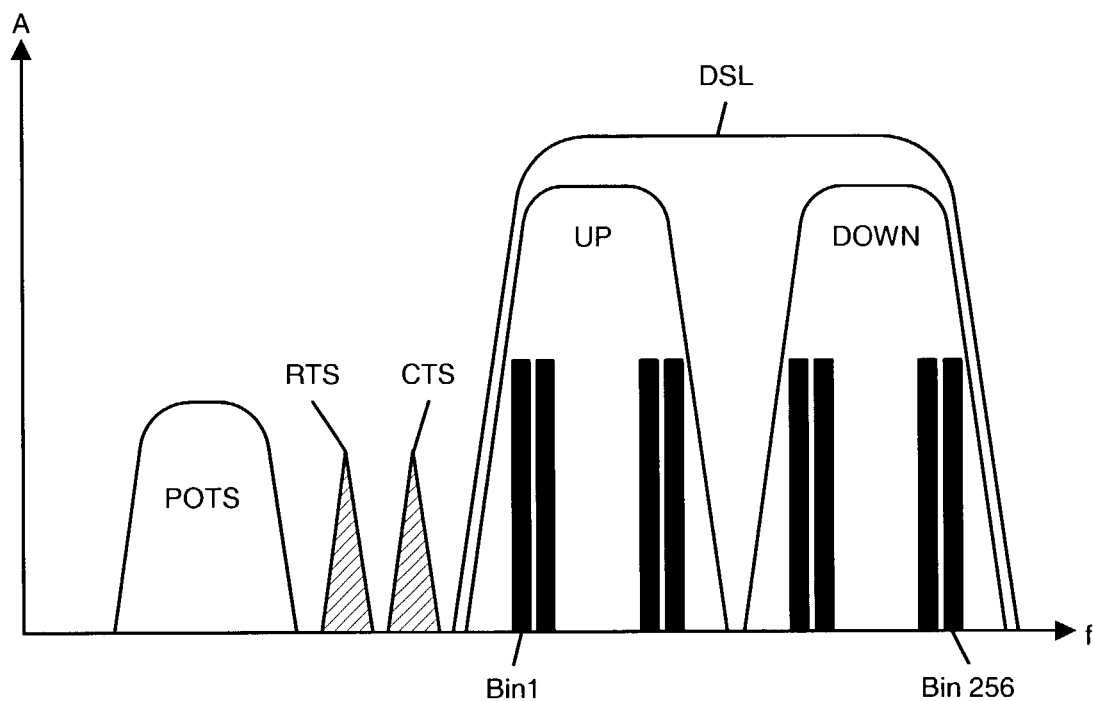
FIG. 3 is a diagram illustrating the frequency band assignments available for DSL communications.

FIG. 3 illustrates the frequency band assignments available for DSL communications. POTS (Plain Old Telephone Service) and DSL are available for all types of DSL communications. The DSL communications band comprises at least two up and down sub-frequency bands. Each sub-band is divided into frequency bins. In the current example there are 256 bins but there may be more or less depending on the DSL implementation. The bits of the bins are reassembled to form superframes.

Figure 4:
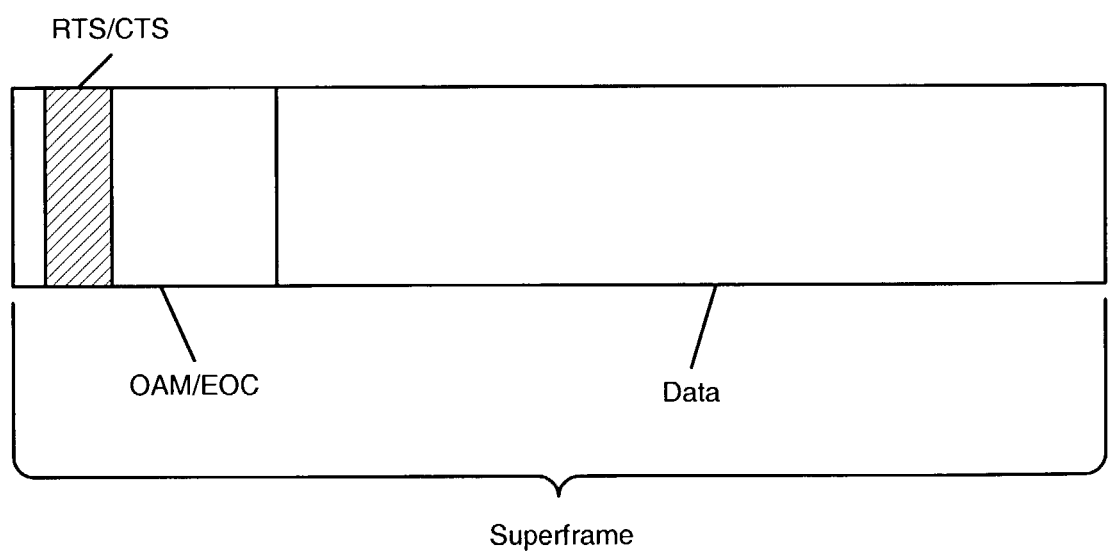
FIG. 4 is an illustration of the components of an exemplary DSL superframe.

FIG. 4 illustrates the components of a superframe. The majority of the superframe contains a data part, the part used to transport data such as user traffic data. The rest of the superframe is used to manage a DSL link via the OAM or EOC channel. The OAM and EOC channel contains various types link management information such as described in ANSI T1.413-1998.

Referring back to FIG. 3, RTS and CTS signals are shown outside the DSL band. While RTS and CTS signals are shown, they should be understood to include any DSL tone or other explicit request used for requesting data. Thus, the terms "data requests" and "requests to send and receive data" are understood to include RTS and CTS requests as well as DSL tone requests. Furthermore, the terms should be understood to include effective requests, as opposed to explicit requests, such as those discussed above, that is requests effectively inferred from the characteristics of the data streams.

One method utilizing explicit requests, embeds the explicit data requests within the OAM/EOC channels as shown in FIG. 4. A preferred method of embedding data requests into the OAM channel is by utilizing indicator bits that are currently unused in the superframe. For example, indicator bits 0 through 7 can be used in an ADSL superframe to communicate RTS/CTS signals. Section 6.4 of ANSI T1.413-1998 describes the use of indicator bits in an ADSL superframe. Data requests can also be embedded in the EOC channel as an EOC command set as defined in section 8 of ANSI T1.413-1998.

Embedding data requests within the OAM/EOC channels has the advantage of requiring only software changes to communicate data request signals. The communication of out-of-band data request signals requires software as well as hardware changes, including, at a minimum, filters to filter out only that part of the spectrum that contains the data request signals.

When a data request, whether effective or explicit, is deasserted for an individual CPE device the entire DSL superframe continues to be transferred with the CPE device. However substantially no user traffic is carried by the superframe when the link is scaled to an idle mode following data request deassertion. As a result, the unused bandwidth can be assigned to another CPE DSL link that requests a data transfer. In other words, the switch 230 of FIG. 2 disconnects a high speed data modem 210 from a CPE device when a data request is deasserted and connects that modem to a CPE device requesting service. Simultaneously, a low bandwidth synchronization modem 220 is connected to the CPE device for which a data request was deasserted and superframes for maintaining synchronization are transmitted.

The switch 230 can be implemented in the analog or digital domain and is preferably capable of connecting any of the M high speed data modems 210 and P low bandwidth synchronization modems 220 to any of the N customer premise equipment devices 240 via the downstream data links 24. It is well understood by those skilled in the art how to construct such switches.

The switch 230 is controlled by the at least one digital signal processor 26 to allow communications and maintain synchronization between the CPE devices 240 and the modems 210, 220. The low bandwidth synchronization modems and the high speed data modems are also in communication with each other either through the communication bus 28 in the case of multiple digital signal processors or through internal circuitry of the digital signal processors in the case when multiple modems are implemented on the same digital signal processor. The customer premise equipment, for example, comprises a plurality of xDSL modems capable of forming and maintaining communications with the high speed data modems 210 and the low bandwidth synchronization modems 220.

As discussed, the high speed data modems 210 and the low bandwidth synchronization modems 220 are implemented in software on at least one digital signal processor. The at least one digital signal processor may also include various filtering and control functions necessary for successful xDSL communications, and other forms of high speed data communications. The digital signal processors are interconnected and configured via the communication bus 28. Any compatible bus may be used, such as the industry standard Peripheral Component Interconnect (PCI) bus, or Asynchronous Transfer Mode (ATM) Forum Utopia Bus.

The communication bus 28 may be connected to an external device such as a microprocessor, microcontroller, or general purpose computer, and may also be connected to additional components and systems such as volatile and non-volatile memory and storage systems. In addition to programming and configuring the digital signal processors 26, the bus may be used to communicate status information with the external device or devices. For example, line statistics of the each downstream data link such as speed, connection time, and line activity may be communicated with the external device. Additionally, bit error rates (BER) for each link may be communicated with the external device. And, user status information corresponding to each customer premise equipment device and downstream data link may be communicated with the external device via the communication bus. User status information, for example, includes whether a customer premise equipment device is connected to a downstream data link, and if connected whether the user is active or inactive.

If a user is active, the external device may signal the digital signal processors via the communication bus to configure a high speed data modem compatible with the customer premise equipment device. If a user is inactive, the external device may signal the digital signal processors via the communication bus to configure a low bandwidth synchronization modem in order to maintain the data link while conserving power. And, if there is no customer premise equipment device connected to a downstream data link, the external device may signal the digital signal processor to switch off the modem associated with the unconnected data link, thereby conserving power. Furthermore, depending on power availability, the digital signal processors may be configured to use variable numbers of high bandwidth data modems and low bandwidth synchronization modems thereby maximizing bandwidth given power availability. And, the speed of the high speed data modems can be regulated to maximize power or bandwidth constraints.

Due to the low bandwidth requirements of the synchronization modems many OAM and EOC modems can easily and inexpensively be implemented on a single digital signal processor. For example, for 25 customer premise equipment xDSL modems, the digital signal processor on which the modems are implemented need only be able to process around 800 kbps to keep all 25 customer premise equipment xDSL lines active. Many modern digital signal processors, such as the Altera Nios, Motorola StarCore, and many processors sold by Globespan are suitable for implementing modems.

Oversubscribing a Pool of Modems

As used here, "oversubscribed" is intended broadly to mean the ability to provide high speed data service, such as xDSL service, to N customers using less than N high speed data modems. Additionally, "oversubscribing an xDSL modem", "oversubscribing a high speed data modem", "oversubscribing a pool of modems", and "oversubscribing a modem pool" is intended broadly to cover oversubscribing one or more high speed data or xDSL modems, as the methods discussed apply equally to one or more xDSL modems.

Referring back to FIG. 2, N customer premise equipment devices receive high speed data service, including transferring user traffic data, from M high speed data modems, where M is less than N when the system 20 is oversubscribed. For example 25 CPE devices may receive xDSL service from 5 xDSL modems. Varying numbers of high speed data modems from 1 to N, according to how the digital signal processors 26 are configured, may provide service to the N CPE devices, whereby if there are N high speed data modems and N CPE devices there is no oversubscription of the high speed data modems and the system 20 of FIG. 2 is operating at maximum power and speed.

Synchronization is maintained for the customer premise equipment devices not receiving high speed data service, that is those customer premise equipment devices in idle mode, via P low bandwidth synchronization modems. Therefore, the maximum number of customer premise equipment devices supported is M+P=N, where $P \geq 1$ in an oversubscribed system. For example, if there are 25 customer premise equipment devices the digital signal processors 26 may be configured as 5 xDSL modems and 15 OAM/EOC modems for maintaining xDSL synchronization, via the transfer of synchronization data, with the 15 customer premise equipment devices not being provided xDSL service by the 5 xDSL modems.

Oversubscribing a pool of modems includes connecting M high speed data modems to a first set of M customer premise devices and connecting P low bandwidth synchronization modems to a first set of P customer premise equipment devices. That is, each high speed data modem is connected to a CPE device and each low bandwidth synchronization modem is connected to a CPE device. Once connected, user traffic data is transferred between the M high speed data modems and the first set of M CPE device, and synchronization data is communicated between the P low bandwidth synchronization modems and the first set of P CPE device.

User traffic data continues to flow between the M high speed data modems and M CPE devices until either there is no more data to transmit and receive between each respective M high speed data modems and M CPE device (no-more-data condition), or until a time-out period has expired (time-out condition). Time-outs are necessary to prevent bandwidth greedy customers from monopolizing bandwidth. A greedy customer is allotted a fixed or varying amount of time during which the greedy customer can transmit and receive data. Once the time period has elapsed, the bandwidth allocated to the greedy customer is made available to subsequent customers. The bandwidth may be reassigned back to the greedy customer after the subsequent customers either complete their data transactions or times-out. In this manner, high quality service is afforded to all customers during heavy network usage times.

Upon a no-more-data or time-out event, the M high speed data modems are connected to a second set of M CPE device, and the P low bandwidth synchronization modems are connected to a second set of P CPE devices. At least some of the devices comprising the second set of M CPE devices are devices that were members of the first set of P CPE devices. In other words, at least some CPE devices that were not receiving high speed data service as part of the first set are connected such as to enable high speed data service as part of the second set. Equivalently, at least some of the second set of P CPE devices are members of the first set of M CPE devices thereby ensuring active DSL connections when high speed data service is switched away from a device that was receiving service as part of the first set.

Once the switchover from the first set of connections to the second set of connections are completed, user traffic data is transferred between the M high speed data modems and the second set of M CPE devices, and synchronization data is transferred between the P low bandwidth synchronization modems and the second set of P CPE devices. It should be further noted that if a time-out or a no-more-data condition for an individual CPE device or devices does not occur, those devices of the first set may continue to receive uninterrupted high speed data service, and thus become part of the second set of M CPE devices. Third, fourth, and additional sets of connections are made thereby allowing all CPE devices to receive DSL service as network usage and request for service varies.

Explicit request to send and receive data, such as RTS/CTS signals, and xDSL tones, are transferred between the N CPE devices and the high speed data modems and the low bandwidth synchronization modems. As discussed above, the requests are preferably embedded within superframes in the case of explicit requests. Otherwise, requests are inferred by monitoring the data streams. In accordance with the requests, connections between the modems and the first, second, and subsequent sets of CPE devices are made.

With less high speed data modems than there are CPE devices for an oversubscribed system there will occasionally be more requests for xDSL service than there are high speed data modems available to provide service. In establishing which CPE devices to provide xDSL service, a first come first served method is employed. That is, the CPE devices first to request service will be first to receive service. It is also advantageous to be able to employ priority queuing schemes so that, for example, those customers paying more for xDSL service receive more access to the available bandwidth. That is, their requests for service take precedence over those requests having a lower priority. An algorithm suitable for queuing multiple requests of varying priorities is Weighted Fair Queuing. Other algorithms well understood by those skilled in the art may be used. Additionally, the priorities may be associated with the time-out conditions introduced above so that customers with a higher priority will have longer time-out periods than those with a lower priority.

Accordingly, oversubscribing a pool of modem comprises the following steps of:

1) providing at least one programmable digital signal processor connected to a communication bus and an upstream data link;

2) configuring, via the communication bus, the at least one programmable digital signal processor as high speed data modems and as low bandwidth synchronization modems;

3) according to priority and order of request, connect each CPE device to either a high speed data modem or a low bandwidth synchronization modem;

4) for each CPE device, if connected to a high speed data modem, transfer user traffic data; otherwise if connected to a low bandwidth synchronization modem, transfer synchronization data;

5) for each CPE device connected to a high speed data modem, check for time-out or no-more-data condition;
 a) if condition does not exist go to step 4.
 b) if condition does exist go to step 3.

Step 3 can employ a first come first served algorithm, a weighted fair queuing algorithm, or any other algorithm for request handling available to those skilled in the art. Requests for high speed data service are communicated via OAM/EOC in-band signals for explicit requests, or are inferred by monitoring the data streams for effective requests. For explicit requests, synchronization data comprises a superframe, and the superframe comprises embedded data request signals. The time-out condition of Step 5 can employ a priority scheme whereby CPE devices having a higher priority have longer time-out periods than those CPE devices with a lower priority. In transferring control from Step 5b to Step 3 some CPE devices connected to high speed data modems may retain their connections inasmuch as no time-out or no-more-data condition has occurred for those devices. In retaining their connections, the devices continue to receive uninterrupted high speed data service. Simultaneously, other CPE devices connected to high speed data modems may be reconnected to low bandwidth synchronization modems.

Figure 5A:
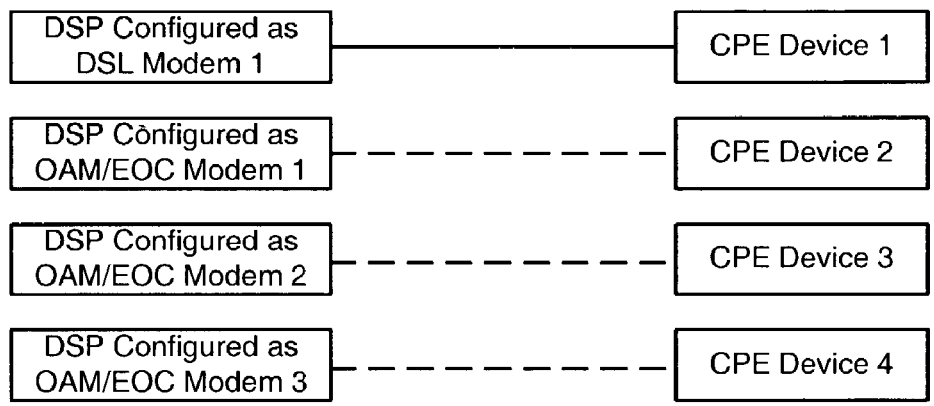
FIGS. 5A–C illustrate a method for oversubscribing a pool of modems.
Figure 5B:
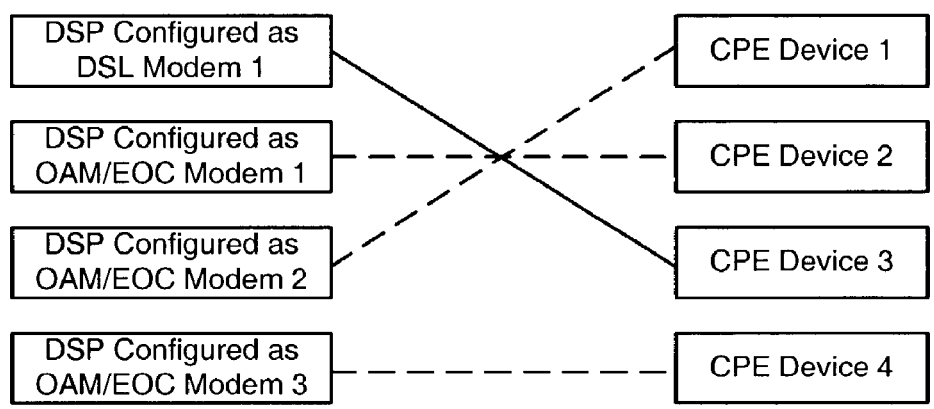
Figure 5C:
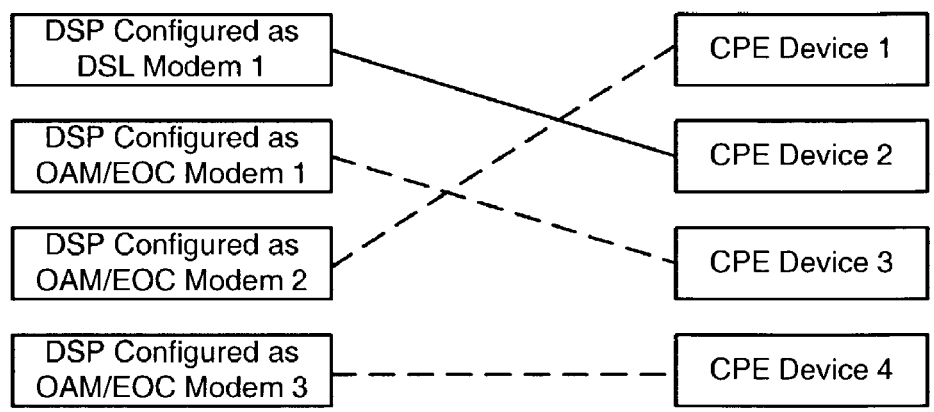

FIGS. 5A–C further illustrate the above detailed method. In this example, M=1, P=3, and N=4, although other values for M, P and N may be used as the digital signal processors 26 of FIG. 2 are fully programmable via the communication bus 28. The solid and dashed lines of FIGS. 5A–C indicate connections, either direct or indirect, between the modems and the CPE devices.

FIG. 5A shows DSL Modem 1 providing DSL service to CPE Device 1. OAM/EOC Modems 1, 2 and 3 provide synchronization data to CPE Device 2, 3 and 4 respectively, for maintaining active DSL lines. Through a time-out or a no-more-data condition, DSL service is removed from CPE Device 1 and provided to CPE Device 3, as shown in FIG. 5B. CPE Device 3 receives DSL service ahead of the other CPE devices because at least one of the following conditions occur: CPE Device 3 was the first to request service, CPE Device 3 was the highest priority device to request service, or CPE Device 3 was the only device to request service. Additionally, OAM/EOC Modem 2 is connected to CPE Device 1 to maintain an active DSL line. The other OAM/EOC Modems remain connected to respective CPE Devices for maintaining synchronization. In FIG. 5C, after a time-out or a no-more-data condition, DSL service is removed from CPE Device 3 and provided to CPE Device 2. In order to maintain an active DSL line a connection is made between OAM/EOC Modem 1 and CPE Device 3.

Specific Embodiments

Figure 6:
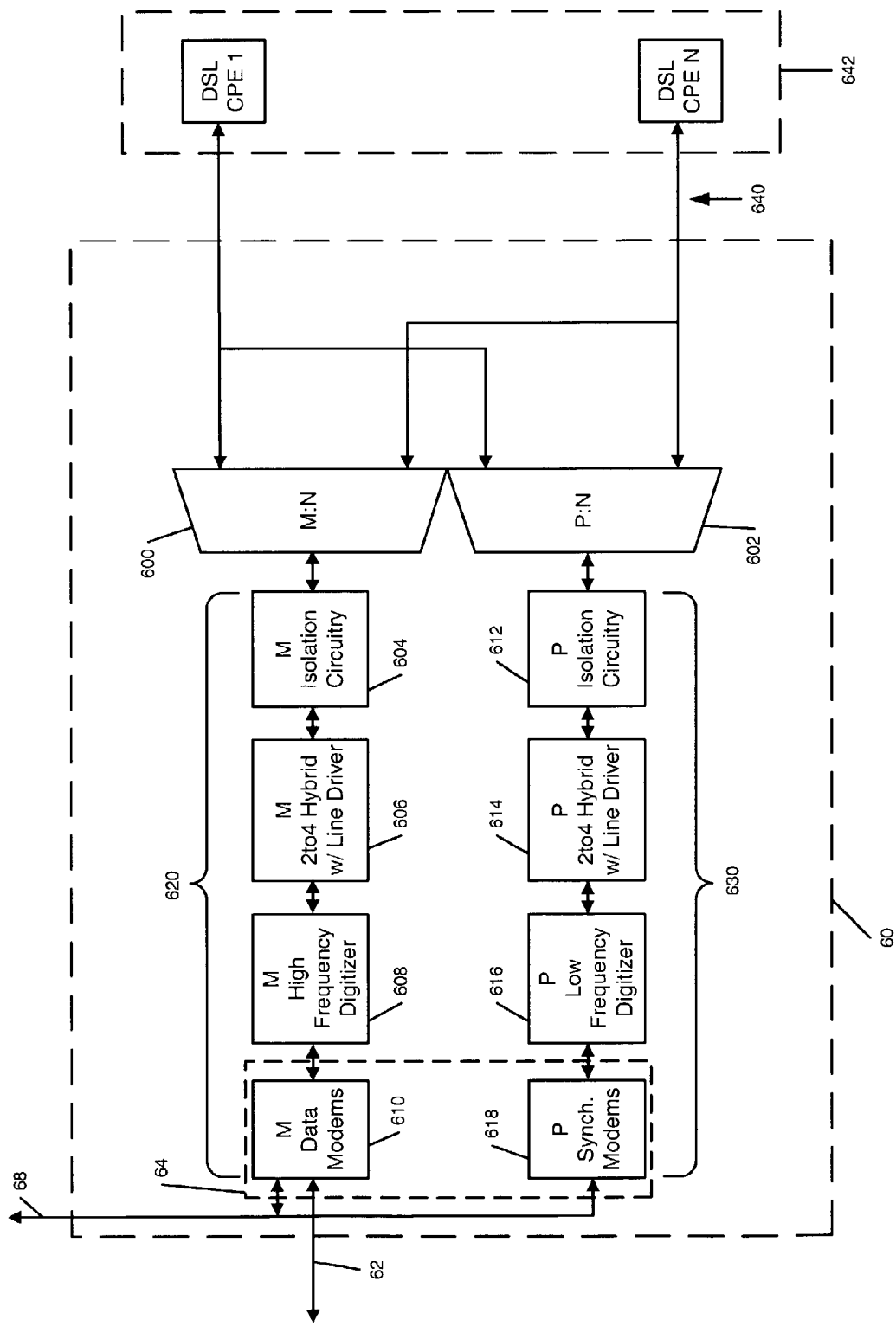
FIG. 6 is a system for oversubscribing a pool of modem comprising high voltage analog multiplexers between customer premise equipment devices and isolation circuitry.

Turning now to FIG. 6, an analog implementation of a system for oversubscribing a modem pool is shown. The modem switching system 60 comprises at least one programmable digital signal processor 64, a communication bus 68 for configuring the digital signal processor 64 and communicating status information with an external device, an M:N analog multiplexer 600 connected to N downstream data links 640, and a P:N analog multiplexer 602 connected to the N downstream data links 640, where M+P=N. The M:N analog multiplexer 600 is coupled to a high speed data path 620. The high speed data path 620 is further coupled to at least one upstream data link 62. The P:N analog multiplexer 602 is coupled to an low bandwidth synchronization path 630.

The high speed data path 620 comprises M high speed data modems 610 executing on the at least one digital signal processor 64 and connected to the at least one upstream data link 62, M High Frequency Digitizers 608 in communication with the M high speed data modems 610, M 2to4 Hybrids with Line Drivers 606 in communication with the M High Frequency Digitizers 608, and M Isolation Circuitry 604 in communication with the M 2to4 Hybrids with Line Drivers 606 and the M:N analog multiplexer 600.

The low bandwidth synchronization path 630 comprises P low bandwidth synchronization modems 618 executing on the at least one digital signal processor 64, P Low Frequency Digitizers 616 in communication with the P low bandwidth synchronization modems 618, P 2to4 Hybrids with Line Drivers 614 in communication with the P Low Frequency Digitizers 616, and P Isolation Circuitry 612 in communication with the P 2to4 Hybrids with Line Drivers 614 and with the P:N analog multiplexer 602.

In this particular implementation the multiplexers 600, 602 are positioned such that they are in direct communications with the isolation circuitry 604, 612, and N CPE devices 642, via the downstream data links 640. This implementation minimizes common circuitry, that is any circuitry interposed between the multiplexers and the downstream data links. Minimizing common circuitry allows for price performance optimization of the data processing circuitry. The data processing circuitry includes the low bandwidth synchronization path and the high speed data path. Since the analog multiplexers 600, 602 are coupled to the downstream data links 640 which, for example, may be the POTS lines, this particular implementation puts high voltage requirements on the analog multiplexers 600, 602. Also, this implementation, puts the analog multiplexers 600, 602 in the high power path, before the line drivers 606, 614. Therefore, typically, the analog multiplexers 600, 602 must be capable of handling around 1 watt per channel.

Figure 7:
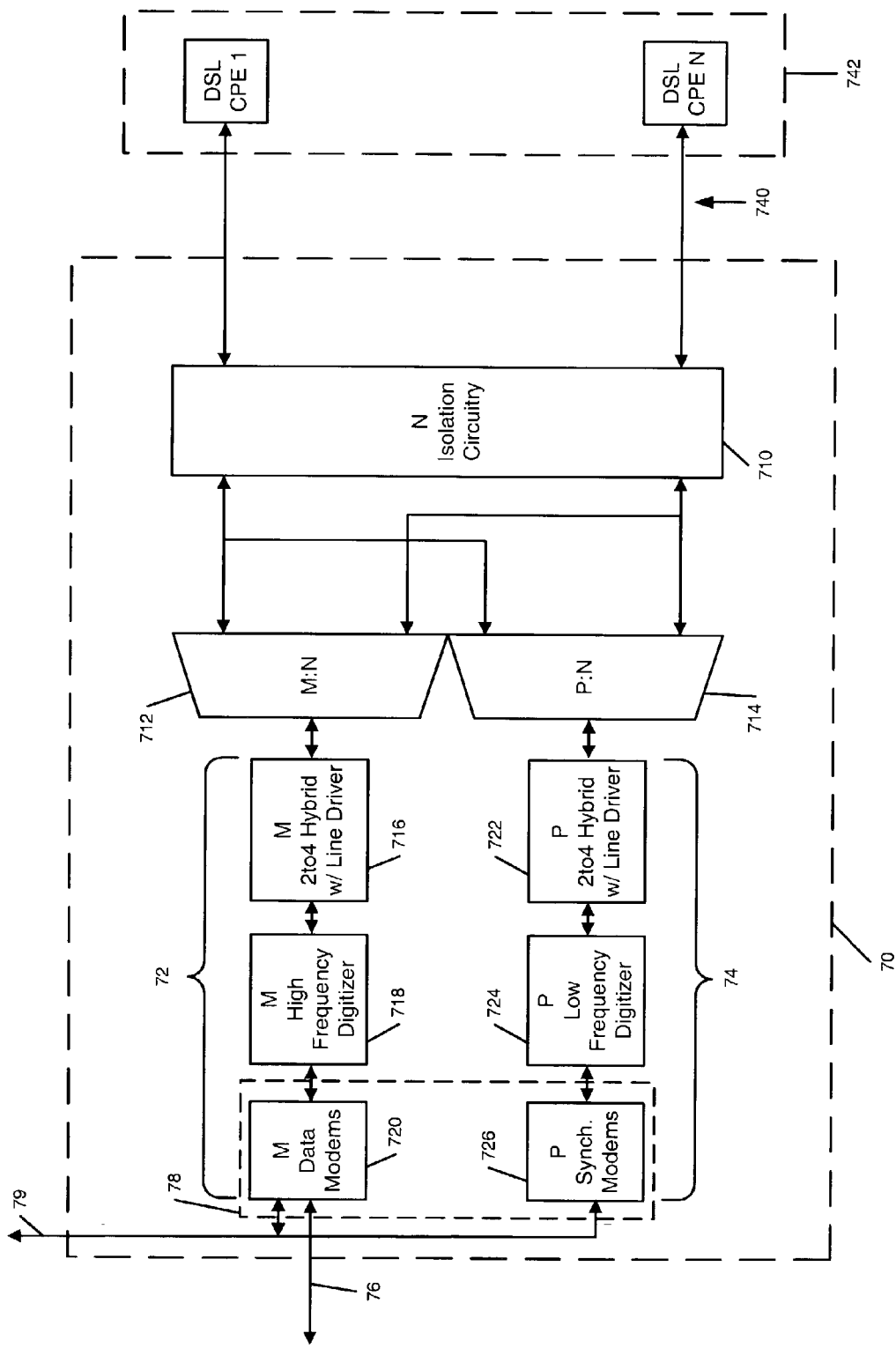
FIG. 7 is a system for oversubscribing a pool of modems comprising low voltage analog multiplexers between hybrids and isolation circuitry.

FIG. 7 shows an alternative analog implementation of a system for oversubscribing a modem pool. The modem switching system 70 comprises at least one programmable digital signal processor 78, a communication bus 79 for configuring the digital signal processor 78 and communicating status information with an external device. Further, the system comprises an M:N analog multiplexer 712 and a P:N analog multiplexer 714, where M+P=N. The M:N analog multiplexer is in communication with a high speed data path 72, and the high speed data path 72 is in communication with at least one upstream data link 76. The P:N analog multiplexer is in communication with an low bandwidth synchronization path 74. Both multiplexers 712, 714 are in communication with N isolation circuitry 710, which is in communication with N CPE devices 742 via downstream data links 740.

The high speed data path 72 comprises M high speed data modems 720 executing on the at least one digital signal processor 78 and connected to the at least one upstream data link 76, M High Frequency Digitizers 718 in communication with the M high speed data modems 720, and M 2to4 Hybrids with Line Drivers 716 in communication with the M High Frequency Digitizers 718 and the M:N analog multiplexer 712.

The low bandwidth synchronization path 74 comprises P low bandwidth synchronization modems 726 executing on the at least one digital signal processor 78, P Low Frequency Digitizers 724 in communication with the P low bandwidth synchronization modems 726, and P 2to4 Hybrids with Line Drivers 722 in communication with the P Low Frequency Digitizers 724 and with the P:N analog multiplexer 714.

Due to the placement of the isolation circuitry 710, the implementation of FIG. 7 allows the analog multiplexers 712, 714 to work at low voltages. Expensive common circuitry is minimized. Power requirements of the multiplexers 712, 714 are high meaning that the amount of power that must pass through the multiplexers is high.

Figure 8:
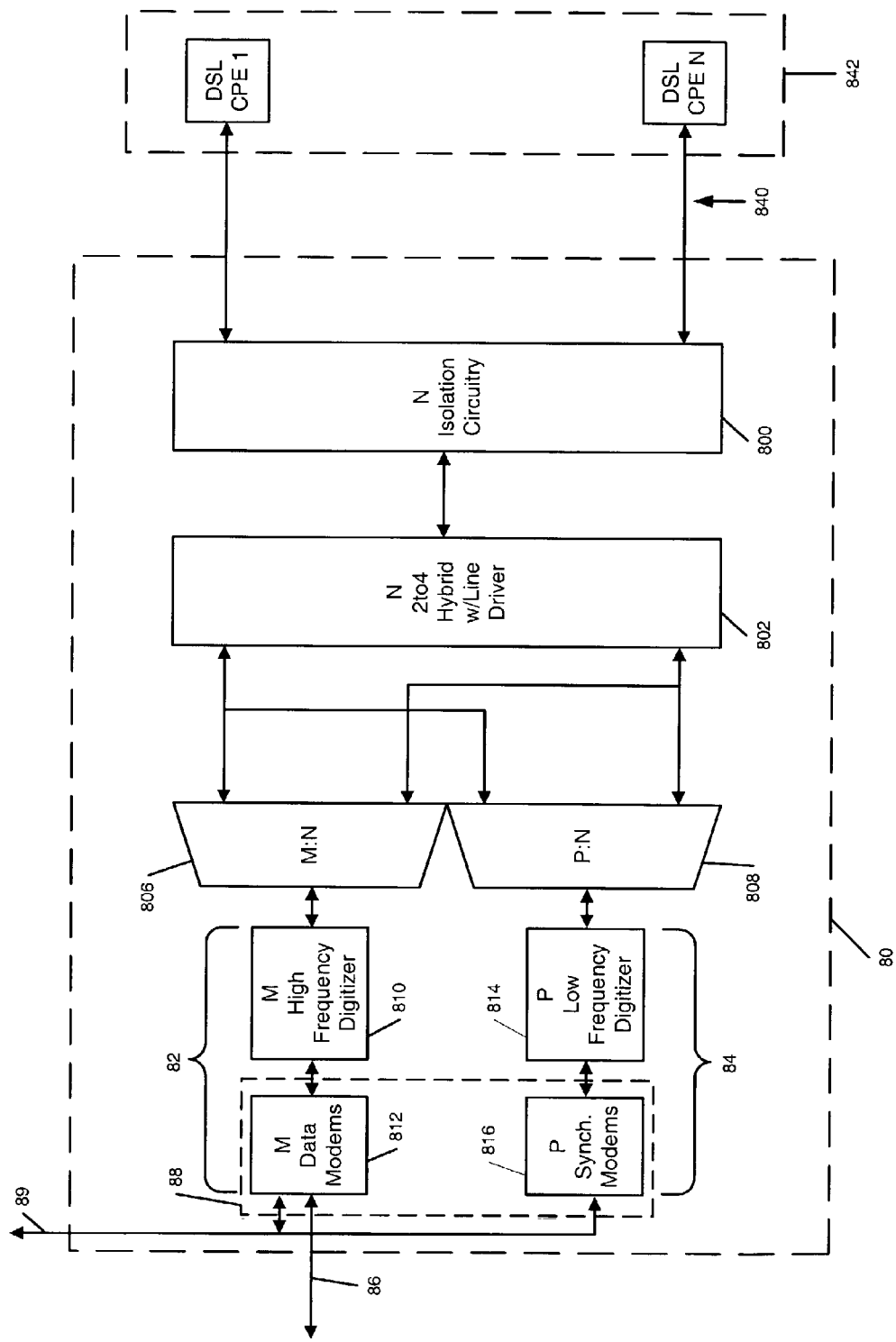
FIG. 8 is a system for oversubscribing a pool of modems comprising low voltage analog multiplexers between digitizers and hybrid circuitry.

FIG. 8 shows another analog implementation of a system for oversubscribing a modem pool. The modem switching system 80 comprises at least one digital signal processor 88, a communication bus 89 for configuring the digital signal processor 88 and for communicating status information with an external device. Further, the system comprises N isolation circuitry 800 coupled to N CPE devices 842 via downstream data links 840. The isolation circuitry in turn is coupled to N 2to4 Hybrids with Line Drivers 802 which in turn is coupled to an M:N analog multiplexer 806 and a P:N analog multiplexer 808.

A high speed data path 82 is in communication with the M:N analog multiplexer 806 and at least one upstream data link 86. The high speed data path 82 comprises M High Frequency Digitizers 810 coupled to the M:N analog multiplexer 806, and M high speed data modems 812 executing on the at least one digital signal processor 88, and coupled to the M High Frequency Digitizers 810 and the at least one upstream data link 86. Similarly a low bandwidth synchronization path 84 comprises P low bandwidth synchronization modems 816 executing on the at least one digital signal processor 88, and P Low Frequency Digitizers 814 coupled to the P:N multiplexer 808 and with the P low bandwidth synchronization modems 816.

By placing the analog multiplexers 806, 808 after the Hybrids with Line Drivers 802, the implementation detailed in FIG. 8 removes the high voltage and power requirements from the multiplexers, but increases the cost of the common circuitry as it requires that every line driver be DSL capable. A DSL capable line driver is one that has a Gain Bandwidth product comparable to the DSL power spectral density mask and has the appropriate output impedance. For ADSL, the line driver has to be capable of −32 dBm across a 1 MHz bandwidth and an output impedance of about 200 ohms. A VDSL line driver has to be capable of −60 dBm across an 8.5 MHz bandwidth and have an output impedance of 100 ohms. In contrast, an ADSL OAM/EOC line driver needs to be capable of −32 dBm across a 350 KHz bandwidth, and a VDSL OAM/EOC line driver has to be capable of −60 dBm across a 4 MHz bandwidth. Also, the output power for an OAM/EOC line driver can potentially be reduced, to, for example, −60 dBm for ADSL and −70 dBm for VDSL. The actual minimum output power is dependent on the transmission line characteristics.

Figure 9:
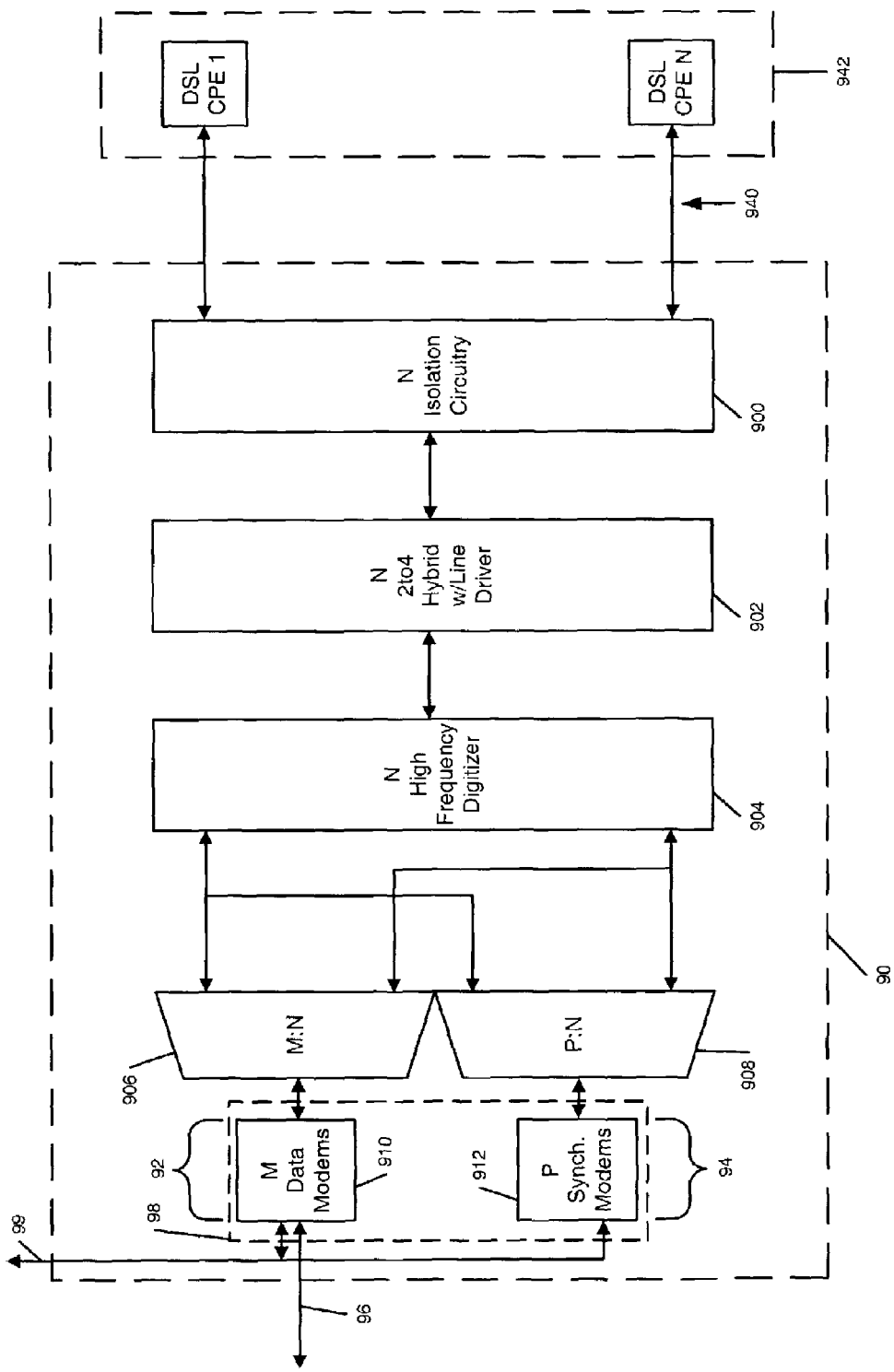
FIG. 9 is a system for oversubscribing a pool of modems comprising digital multiplexers.

FIG. 9 show a digital implementation of a system for oversubscribing a modem pool. Switching system 90 comprises at least one programmable digital signal processor 98, a communication bus 99 for configuring the digital signal processor 98 and communicating status information with an external device. Further, the system comprises N Isolation Circuitry 900 in communication with N CPE devices 942 via downstream data links 940, N 2to4 Hybrids with Line Drivers 902 in communication with the N Isolation Circuitry 900, N High Frequency Digitizers 904 in communication with the N 2to4 Hybrids with Line Drivers 902, and an M:N digital multiplexer 906 and a P:N digital multiplexer 908 each in communication with the N High Frequency Digitizer 904. A high speed data path 92 is in communication with the M:N digital multiplexer 906 and with at least one upstream data link 96. The high speed data path 92 comprises M high speed data modems 910 executing on the at least on digital signal processor 98, and connected to the at least one upstream data link 96 and the M:N digital multiplexer 906. A low bandwidth synchronization path 94 is in communication with the P:N digital multiplexer 908. The low bandwidth synchronization path 94 comprises P low bandwidth synchronization modems 912 executing on the at least one digital signal processor 98, and in communication with the P:N digital multiplexer 908. As in the previous embodiments the relationship between the ports of the M:N and P:N digital multiplexers 906, 908 respectively is M+P=N.

This implementation while requiring the highest performance from the common circuitry is very inexpensive and reliable due in part to the relative simplicity of digital multiplexers.

Figure 10:
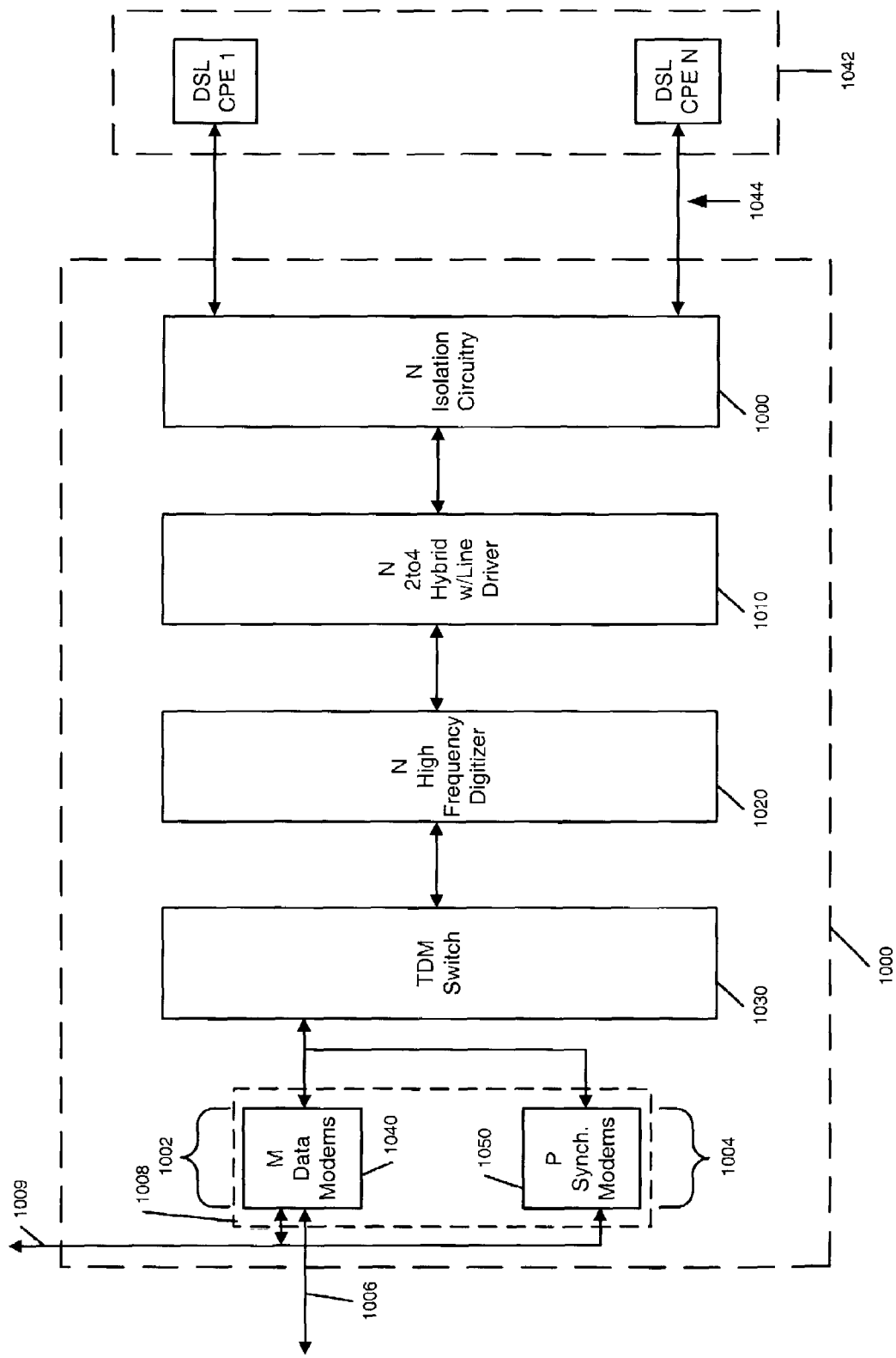
FIG. 10 is a system for oversubscribing a pool of modems comprising a time division multiplexed switch.

Another embodiment of a system for oversubscribing a modem pool is shown in FIG. 10. The switching system 1000 comprises at least on programmable digital signal processor 1008, a communication bus 1009 for configuring the digital signal processor 1008 and for communicating status information with an external device, a Time Division Multiplexed (TDM) Switch 1030, N High Frequency Digitizers 1020 in communication with the TDM Switch 1030, N 2to4 Hybrids with Line Drivers 1010 in communication with the N High Frequency Digitizers 1020, N Isolation Circuitry 1000 connected to N CPE devices 1042, via N downstream data links 1044, and in communication with the N 2to4 Hybrids with Line Drivers 1010. A high speed data path 1002 and a low bandwidth synchronization path 1004 are both in communication with the TDM Switch 1020. The high speed data path 1002 is in further communication with at least one upstream data link 1006. The high speed data path 1002 comprises M high speed data modems 1040 executing on the at least one digital signal processor 1008, and in communication with the TDM switch 1030, and further connected to the at least one upstream data link 1006. The low bandwidth synchronization path 1004 comprises P low bandwidth synchronization modems 1050 executing on the at least one digital signal processor 1008, and in communication with the TDM Switch 1030.

This foregoing implementation while being the simplest is the most expensive of the embodiments described above to implement. The design and use of TDM switches is well understood by those skilled in the art.

In all of the foregoing implementations the high speed data modems are preferably implemented as software on one or more digital signal processors but may be implemented using any combination of suitable software or hardware. Many types of DSL modems, compatible with many different protocols, can be implemented. By way of example, some of the DSL implementation include but are not limited to ADSL for both DMT (Discrete Multi-Tone Modulation) or QAM (Quadrature Amplitude Modulation), and VDSL (DMT or QAM) . The data types that the modems transfer over the link are independent of the implementation. Therefore internet protocol (IP), asynchronous transfer mode (ATM), or any other framing protocol is compatible with present invention.

The systems described herein for oversubscribing a DSL modem can replace banks of modems used, for example, in a DSLAM. Additionally, the systems may replace the DSL modems of other systems employing banks of modems.

The foregoing detailed description has discussed only a few of the many forms that this invention can take. It is intended that the foregoing detailed description be understood as an illustration of selected forms that the invention can take and not as a definition of the invention. It is only the following claims, including all equivalents, that are intended to define the scope of this invention.

What is claimed is:

1. A method for oversubscribing a pool of modems, comprising the steps of:
   configuring a programmable digital signal processor as M high speed data modems and P low bandwidth synchronization modems;
   connecting the M high speed data modems to a set of M customer premise equipment devices;
   connecting the P low bandwidth synchronization modems to a set of P customer premise equipment devices;
   transferring user traffic data between the M high speed data modems and the set of M customer premise equipment devices;
   transferring synchronization data between the P low bandwidth synchronization modems and the set of P customer premise equipment devices; and
   dynamically reconfiguring the connections to the set of M customer premise equipment devices and P customer premise equipment devices such that at least one device of the set of P customer premise equipment devices is connected to one high speed data modem of the group of M high speed data modems so the user traffic data is transferred between the at least one device of the set of P customer premise equipment devices and the one high speed data modem of the group of M high speed data modems, and such that at least one device of the set of M customer premise equipment devices is connected to one low bandwidth synchronization modem of the group of P low bandwidth synchronization modems so the at least one device of the set of M customer equipment devices remains in a state as if it was connected to a high speed data modem.

2. The method of claim 1, further comprising the step of:
   determining the sets of M and P customer premise equipment devices by monitoring data streams associated with the M and P customer premise equipment devices.

3. The method of claim 1, further comprising the step of:
   determining the sets of M and P customer premise equipment devices via data request signals embedded within superframes.

4. The method of claim 1, wherein a total number of customer premise equipment devices N is subscribed to the pool of modems, and wherein M+P=N.

5. The method of claim 4, wherein P is at least 1.

6. The method of claim 1, further comprising the step of:
   switching off a surplus modem to conserve power, the surplus modem comprising an extra high speed data modem in addition to the M high speed data modems or an extra low bandwidth synchronization modem in addition to the P low bandwidth synchronization modems, wherein the surplus modem is not connected to one of the M and P customer premise equipment devices.

7. The method of claim 6, further comprising the step of:
   if an additional customer premise equipment device is connected to the surplus modem that is off, switching on the surplus modem and configuring the surplus modem as a high speed data modem or a low bandwidth synchronization modem.

8. The method of claim 1, further comprising reconfiguring one of the M high speed data modems as a low bandwidth synchronization modem.

9. The method of claim 1, further comprising the step of: reconfiguring one of the P low bandwidth synchronization modems as a high speed data modem.

10. The method of claim 1, wherein the power requirements of each of the P low bandwidth synchronization modems are around 30 percent or less than the power requirements of each of the M high speed data modems.

11. The method of claim 1, further comprising the step of: for each of the M high speed data modems connected to each of the set of M customer premise equipment devices, stopping the transfer of the user traffic data when at least one of the following conditions is met: time-out, or no-more-data.

12. The method of claim 1, further comprising the step of: communicating status information from the pool of modems to an external device via a communication bus.

13. A system for oversubscribing a pool of modems, comprising:
a programmable digital signal processor configured as M high speed data modems and P low bandwidth synchronization modems;
a communication bus connected to the programmable digital signal processor for configuring the programmable digital signal processor; and
a switch connected to a plurality of N downstream data links, the M high speed data modems, and the P low bandwidth synchronization modems, the plurality of N downstream data links providing service to a plurality of M and P customer premise equipment devices, such that the M high speed data modems are in communication with the plurality of M customer premise equipment devices such that full data transmission is achieved so that user traffic data is transferred between the M high speed data modems and the plurality of M customer premise equipment devices, and the P low bandwidth synchronization modems are in communication with the plurality of P customer premise equipment devices, such that the plurality of P customer premise equipment devices remains in a state as if connected to a high speed data modem; and
wherein the switch dynamically reconfigures customer premise equipment device connections such that at least one of the plurality of M and P customer premise equipment devices is connected to either one of the group of M high speed data modems or to one of the group of P low bandwidth synchronization modems.

14. The system of claim 13, further comprising interface means for coupling the programmable digital signal processor with the switch, and for coupling the switch with the plurality of N downstream data links.

15. The system of claim 13, wherein the communication bus communicates line statistics of the plurality of N downstream data links with a device external to the system.

16. The system of claim 13, wherein the communication bus communicates bit error rates with a device external to the system.

17. The system of claim 13, wherein the communication bus communicates user status information of the plurality of M and P customer premise equipment devices and the plurality of N downstream data links with a device external to the system.

18. The system of claim 13, further comprising: means for communicating data request signals between the respective customer premise equipment devices and the M high speed data modems or the P low bandwidth synchronization modems.

19. In a system for communicating with a plurality of customer premise equipment devices, a method for oversubscribing a pool of modems, comprising:
(a) providing at least one programmable digital signal processor connected to a communication bus and an upstream data link;
(b) configuring via the communication bus the at least one programmable digital signal processor as high speed data modems and low bandwidth synchronization modems;
(c) according to the priority and order of a request from each customer premise equipment device, connecting each customer premise equipment device to a high speed data modem or a low bandwidth synchronization modem;
(d) for each customer premise equipment device, if connected to a high speed data modem, transferring user traffic data, otherwise if connected to a low bandwidth synchronization modem, transferring synchronization data;
(e) for each customer premise equipment device connected to a high bandwidth data modem, determining if a time-out or a no-more-data condition exists; and
(f) if the time out or no-more-data condition exists, repeating steps (c)–(e), otherwise repeating steps (d)–(e).

* * * * *